United States Patent Office 3,273,759
Patented Sept. 20, 1966

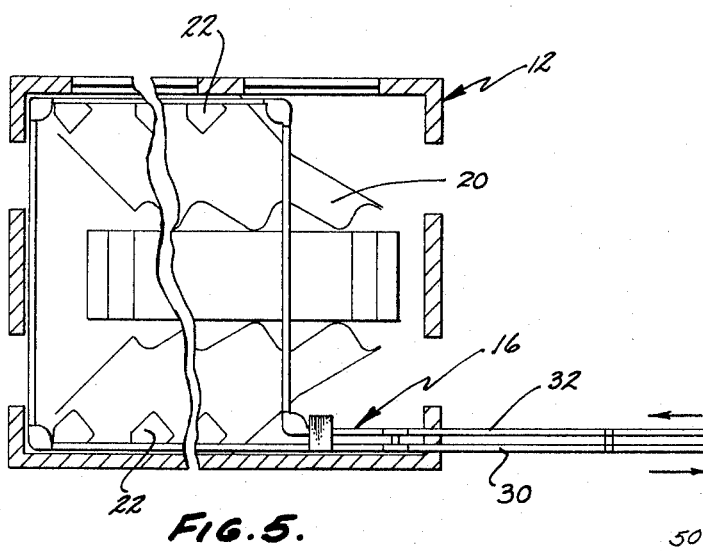
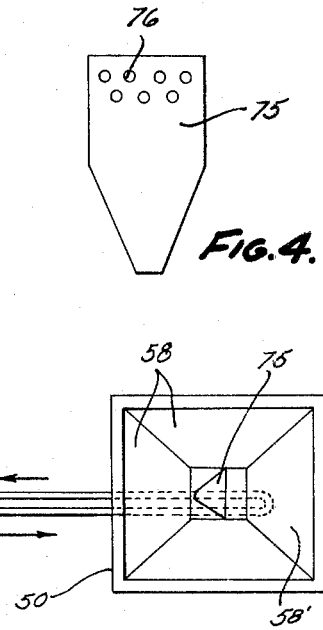
FIG. 4.
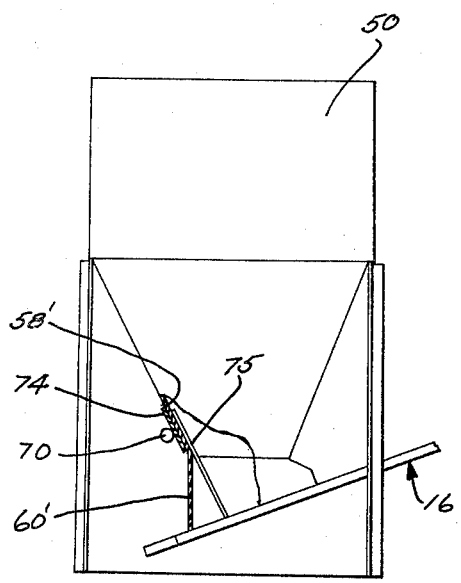
FIG. 5.
FIG. 3.
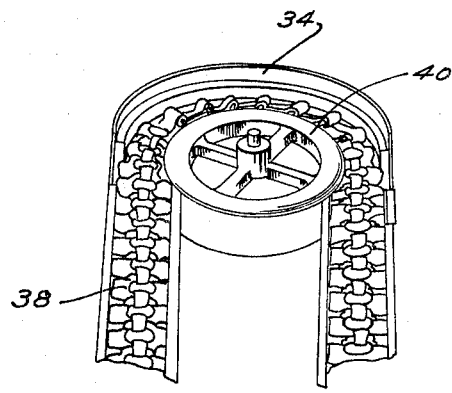
FIG. 6.
INVENTORS
PRESTON D. RIGTERINK
RICHARD A. HAGGARD
BY
ATTORNEYS

3,273,759
BIN AND CHAIN FEED SYSTEM
Preston D. Rigterink, Holland, Mich., and Richard A. Haggard, Nacogdoches, Tex., assignors to Big Dutchman, Inc., a corporation of Michigan
Filed Apr. 29, 1964, Ser. No. 363,535
4 Claims. (Cl. 222—202)

This invention relates to animal feeding hopper and conveyor equipment, and more particularly to hopper flow stimulator to prevent bridging.

Automated animal feeding systems often employ a large outdoor hopper in combination with a conveyor to transfer feed into the animal house. The conveyor is usually mounted to the bottom of the hopper which has convergent lower walls forming a boot. The boot funnels the feed into the conveyor for transfer into the animal house. A convergent bottom on the hopper is conventional because of structural strength derived therefrom and because of the necessity of funneling the particulate feed matter into the narrow trough of the conveyor. This convergent bottom, however, creates a definite problem in hoppers, especially outdoor hoppers where moisture is more prevalent. This problem is caused by "bridging" of the feed over the convergent walls, causing the feed particles to cake and "hang-up" in the hopper. Consequently, the feed does not flow into the conveyor trough as is intended. In automated systems, the failure of feed flow to the animals may even go unnoticed. This problem can therefore defeat one main purpose of the automation, i.e. regular uniform feeding.

It is therefore an object of this invention to provide an animal feeding hopper system having reliable feed flow from the hopper to the conveyor, without "hang-up" due to "bridging" in the hopper.

It is another object of this invention to provide a hopper discharge stimulator causing dependable discharge flow of feed while using simple, reliable, relatively inexpensive and readily attached structure.

These and several other objects of this invention will become apparent upon studying the following specification in conjunction with the drawings in which:

FIG. 3 is a side elevational view of the hopper and conveyor shown partly broken away to illustrate the juncture thereof;

FIG. 4 is an enlarged elevational view of the vibrator reed employed with the structure of FIGS. 1 through 3;

FIG. 5 is a plan view of the system in FIG. 1; and

FIG. 6 is a fragmentary, enlarged, perspective view of the return bend on the conveyor mechanism beneath the hopper.

Referring specifically to the drawings, the complete system 10 there illustrated includes an animal house subassembly 12, a hopper subassembly 14, and a conveyor subassembly 16 extending from the hopper to the animal house.

Figure 1:
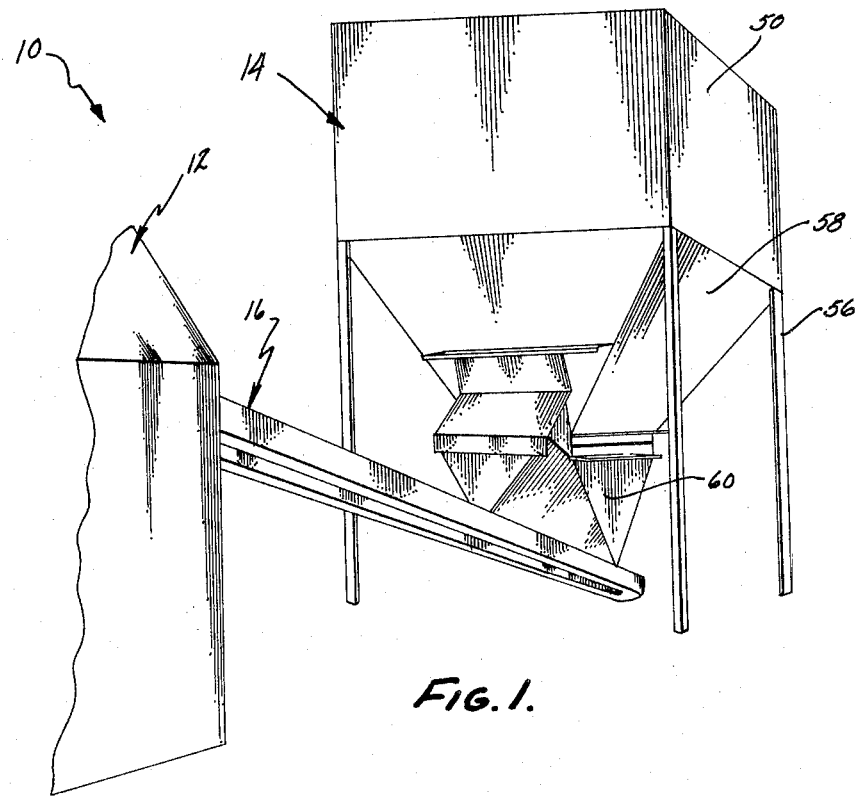
FIG. 1 is a perspective view of a typical hopper, conveyor and animal house system.
Figure 2:
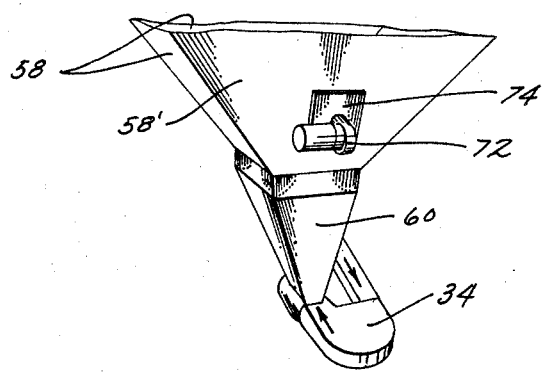
FIG. 2 is a fragmentary, perspective view of the hopper and conveyor in FIG. 1, from the opposite direction.

The animal house may be any of several different types depending on the type of animals to be housed. If for cows, it includes feed boxes 22 beneath the conveyor mechanism 16, for each stall 20. This conveyor mechanism includes a delivery trough 30 and a return trough 32, both forming part of a continuous circuit which passes through the animal house (FIG. 5) and then returns around bend 34 (FIGS. 2 and 6). For this system, the conveyor includes the hollow closed trough, and a conveyor chain 38 of flexibly interconnected steel links like those in Patent 2,737,823 for example. This chain passes around guide wheels 40 at the bends in the trough to move smoothly through the conveyor system when powered by its motor (not shown).

The hopper subassembly 14 includes a plurality of vertical side walls 50 which together form internal chamber 52. It is shown in FIG. 5 with the top removed. The chamber is supported elevated from the ground by a plurality of legs 56. The bottom of the hopper is convergent, being formed by the four convergent walls 58 which terminate in a funnel-type boot element 60 at the base. The boot communicates with the side of the conveyor receiving feed for the system.

Characteristic of this type of hopper is the tendency for the feed to bridge across the convergent boot over the narrow opening through which the feed must pass. To overcome this, the assembly illustrated is utilized. It includes a motor 70 operably connected with a conventional oscillatory, off-center vibrator 72. Both are mounted to a heavy reinforcing plate 74 welded to the relatively thin convergent diagonal wall panel 58' on the back of the hopper.

Mounted to the inside of this same wall is a vibrator reed plate of panel 75 (FIGS. 3, 4 and 5). It is formed of a flexible material such as spring steel. This vibrator reed has its upper end attached to boot wall 58' adjacent the vibrator but on the opposite side (FIG. 3). It can be secured by bolts through bolt holes 76 (FIG. 4), or by any other equivalent attaching means. The vibrator reed panel projects diagonally downwardly so that its lower end projects out into the outlet opening toward the opposite wall of the boot. Preferably, its lower end extends almost to the conveyor itself. The lower end is free to vibrate without any contact with adjacent surfaces, since wall 60' of boot funnel 60 is vertical immediately behind the vibrator reed. The free lower end of the reed has convergent edges to a narrow end tip portion to achieve optimum vibration over a substantial share of the opening width. The upper surface of the reed means has feed resting thereon during normal use. Often conveyor 16 is on an upward incline to the animal house, and the vibrator is substantially normal thereto as in FIG. 3.

Optimum vibrating conditions to prevent bridging and to break up any caking that does occur is achieved by this combination. Rigid mounting plate 74 is sufficiently sturdy to support a vigorous vibrating action. The adjacent wall panel 58' of the boot is substantially more flexible to vibrate along with the dynamic vibrator reed itself 75.

Operation

In order to achieve constant feed in a reliable fashion from the hopper to the conveyor to the animal house, the system is preferably automated. When the conveyor motor is actuated by the switching mechanism, either automatic or manual, the vibrator motor 70 is also actuated. This drives the vibrator which vibrates the entire wall panel 58' of the boot and the reed. Vibrator reed 75 moves back and forth over a relatively large space at a high frequency in the discharge opening. Since the vibrator reed panel and the boot wall panel are diagonally at an angle, the feed rests thereagainst by force of gravity. With vibration, the feed is imparted with a simultaneous vertical lateral movement to break up any bridging that might tend to occur. It has been found that the unit operates effectively for dependable feed discharge even though the hopper is operated only at infrequent intervals, and even though the hopper is located outside to be subject to excessive moisture condensation.

Various additional advantages will probably occur to those in the art upon studying the foregoing specification and drawings. Also, it is conceivable that various minor changes in details may be made in the particular structure shown to suit a particular type of animal, style of hopper construction, or materials employed for the hopper, conveyor or reed vibrator means. Accordingly, this invention is not to be limited to the specific preferred form of the invention illustrated, but only by the scope of the appended claims and the reasonable equivalents thereto.

We claim:

1. A feed hopper mechanism for an animal feed system, comprising: a walled vessel forming a hopper having a bottom discharge outlet; a boot structure on the bottom of said hopper, having convergent walls extending downwardly from said hopper outlet to direct feed therefrom into a conveyor means positioned immediately beneath the said boot; an elongate flexible panel having a free length extending downwardly into said boot and terminating near the lower end thereof and directly above said conveyor means; vibrator means on the exterior of said hopper mechanism and arranged to impart vibrations to said panel; said panel when vibrated flexing increasingly along its free length such that the bottom end thereof moves in a sweeping motion between the converging walls of the boot directly above said conveyor means and in the direction of motion thereof to cause particulate matter within the boot to be imparted simultaneously with a vertical and lateral motion serving to break up bridging of the particulate matter.

2. The feed hopper mechanism defined in claim 1, wherein said flexible panel is fixedly mounted to a wall of said hopper, and wherein said vibrator means is mounted on the outside of the same said hopper wall to vibrate such wall and thereby impart vibrations to the flexible panel, said panel vibrations increasing in amplitude along the said free length thereof.

3. The hopper mechanism defined in claim 1, wherein said flexible panel free length has convergent lower end portions which generally follow the converging contour of the walls of said boot but are free of contact therewith, said converging design augmenting the vibrational flexibility of said free length.

4. The feed hopper mechanism defined in claim 3, wherein said flexible panel is fixedly mounted to a wall of said hopper, and wherein said vibrator means is mounted on the outside of the same said hopper wall to vibrate such wall and thereby impart vibrations to the flexible panel, said panel vibrations increasing in amplitude along the said free length thereof.

References Cited by the Examiner
UNITED STATES PATENTS

| | | | |
|---|---|---|---|
| 1,090,120 | 3/1914 | Scott | 222—202 |
| 1,324,930 | 12/1919 | Schaffer | 222—202 X |
| 2,187,376 | 1/1940 | Guibert | 222—193 X |
| 2,633,133 | 3/1953 | Higgins. | |
| 2,738,765 | 3/1956 | Hart | 119—52 |
| 2,740,561 | 4/1956 | Coffman | 222—409 |

ROBERT B. REEVES, *Primary Examiner.*

STANLEY H. TOLLBERG, LOUIS J. DEMBO,
*Examiners.*